May 26, 1959
H. Z. TABOR
2,888,007
WINDOWS FOR ADMITTING SOLAR RADIATION
Filed March 2, 1956
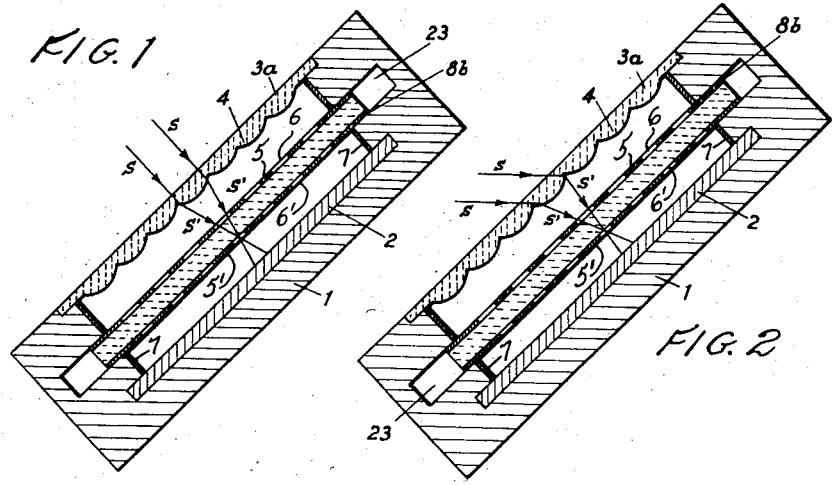
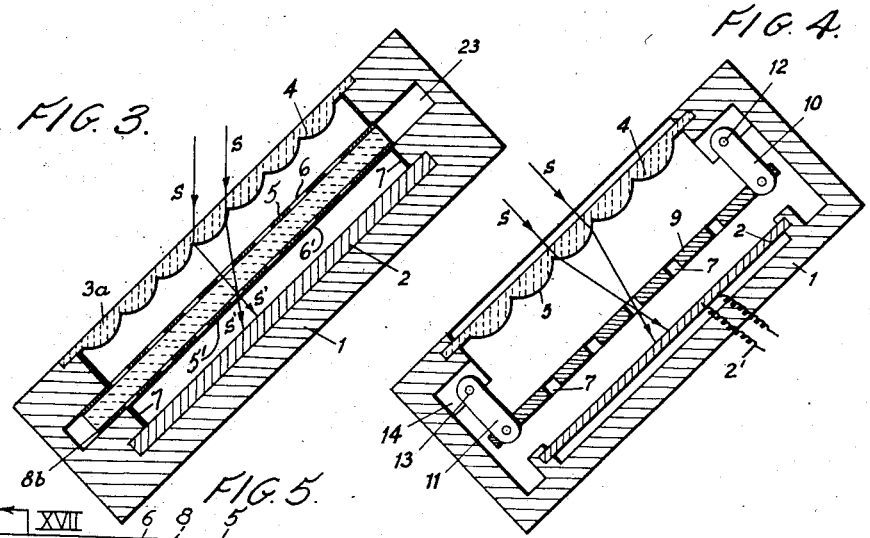
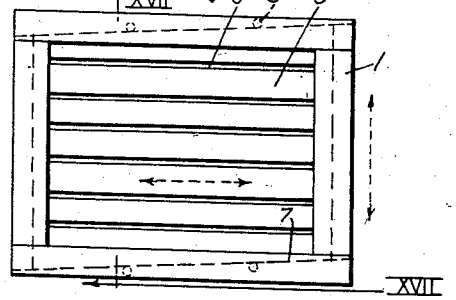
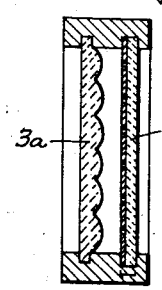
INVENTOR.
Harry Zvi Tabor
BY

United States Patent Office

2,888,007
Patented May 26, 1959

2,888,007

WINDOWS FOR ADMITTING SOLAR RADIATION

Harry Zvi Tabor, Jerusalem, Israel, assignor to State of Israel, Prime Minister's Office, Jerusalem, Israel Application March 2, 1956, Serial No. 569,098

Claims priority, application Israel March 25, 1955

6 Claims. (Cl. 126—270)

This invention concerns the use of solar energy for heating purposes or for the generation of power or electric current, by collecting solar radiation in an enclosed space into which the radiation is made to enter through a window. For example, the enclosed space may be a room to be heated as a whole, e.g. a green-house or the like, or it may contain a receiver in which the radiated energy is transformed into usable heat or power.

In such sun-heated enclosed spaces of known design, a considerable part of the wall and/or ceiling area is usually taken up by the window that admits the solar radiation. The window is usually constituted by a single glass pane, or by two parallel glass panes enclosing an air layer between them with a view to reducing the losses of heat from the space to the outer air. Hollow glass bricks may take the place of double panes and are deemed to be included in the term "double panes" used herein.

The receivers are in general constituted by metal plates, single tubes or nests of tubes, boxes, or arrays of metal thermo-couple junctions upon which the solar radiation is allowed to fall either directly or concentrated with the aid of lenses or mirrors. The receiver is as a rule blackened in order to increase its absorption of solar energy. The glass panes are parallel to the receiver surface and generally spaced a few centimeters from it and from one another. Sometimes one of the air spaces is evacuated in order still further to reduce the heat losses from the receiver. That part of the receiver not exposed to solar radiation is suitably insulated. Useful energy is extracted from the receiver by heat exchange with a fluid passing through it, or in thermo-electric receivers by withdrawing the electric current generated therein.

In these known arrangements, energy is lost by convection and radiation in proportion to the rise of temperature of the receiver above that of its surroundings. Indeed one of the major difficulties in obtaining a high temperature for the extracted energy with a high efficiency of collection (i.e. small losses), is due to the reradiation of energy by the blackened receiver, and the poor insulating properties of the glass cover panes owing to the transfer of heat between them and their surroundings by radiation.

It is known that the major cause of heat transfer across an air space bounded by two double glass panes is the radiation of heat from one of these panes to the other one, when there is a difference of temperature between them, rather than convection or conduction across the air gap, and a considerable part of the heat loss from a floor or objects in a room to the walls of the room is also due to radiation, if the former are at a higher temperature than the walls.

The present invention has the object to provide means for reducing this radiation transfer without affecting the transparency of the system to solar energy, with a view to reducing the heat losses from the interior of the enclosed space without affecting the intake of energy.

The transfer of energy by radiation between two surfaces relatively close to one another is proportional to $$\frac{1}{\frac{1}{e_1}+\frac{1}{e_2}-1}$$

where $e_1$ is the emissivity of one surface and $e_2$ the emissivity of the other surface. Glass has an emissivity nearly equal to unity whereas polished or untarnished metals have very low emissivities.

Thus when the temperature of the receiver rises owing to the absorption of solar energy above that of its surroundings and in particular above the temperature of the glass pane immediately covering it, heat is transferred from the receiver surface to the cover glass by convection (if the space between the receiver and the glass is not evacuated) and by radiation. The radiation loss is proportional to the difference of the fourth powers of the absolute temperatures and is dependent both upon the emissivity of the receiver surface and that of the cover glass. The emissivity of glass is nearly unity, as is the emissivity of the blackened receiver unless it is artificially made to have selective radiation properties.

The transfer of heat to the cover glass raises its temperature and the glass in turn transfers heat away from the receiver by radiation and convection. If no second glass pane is provided, considerable cooling can occur by the action of wind, but where a second glass pane is used, the transfer of heat from the first pane to the second one is similar to the transfer of heat from the receiver to the first pane, i.e. by convection (if the space is not evacuated) and by radiation. More than two cover glass panes may be used, the number chosen being a compromise between the extra insulation thereby provided and the losses occurring in the transmission of solar energy through the glass panes. In all cases, the radiation loss is dependent upon the emissivities of the glass surfaces that face one another, or of the glass surface that faces the receiver.

According to the present invention, the effective emissivity of any one or more of the glass surfaces is substantially reduced without at the same time affecting the passage of solar energy through the glass, and a considerable reduction of heat transfer away from the receiver by radiation is achieved, resulting in a more efficient collector and higher temperatures for the extracted heat.

The invention consists in a window for admitting solar radiation into an enclosed space where it is utilized for the generation of heat, power or electric current, being constituted by at least one glass or the like transparent plate having on one surface a plurality of lenses designed to focus the solar radiation into the enclosed space, all the focal points being located substantially in one plane ("focal plane"); and a screen disposed in the focal plane, having a plurality of narrow openings for the passage of the focused solar radiation and adapted to reflect any reradiation from the receiver back towards the interior.

The term "re-radiation" should be understood to include the self-radiation of the receiver, as well as the reflection of any radiation not absorbed by it.

The window according to the invention will hereinafter also be referred to as "solar trap."

The transparent plate and screen are distinct bodies, the former being arranged with the lenses disposed either on the outer side or on the inner side, while the screen is disposed at a distance from the transparent plate. The screen may be constituted by a plane transparent plate, e.g. from glass, metallized on one or both surfaces, or by a reflective metal or the like plate which may have slots or apertures for the passage of the sun rays focused thereon.

The inner screen is mounted so that the opening of the screen can laterally be displaced relative to the lenses. This, as will be explained below in greater detail, gives a possibility of adjusting the window to different noon altitudes of the sun according to the season without varying the position of the window and solar heater as a whole.

The space between the outer lens bearing plate and the inner screen may, if desired, be evacuated.

The lenses may have any desired form, e.g. of spherical protuberances disposed in rows or otherwise. It is preferred, however, to make them in the form of parallel lenticular ribs of substantially cylindrical forms in which case the images of the sun will be parallel narrow bands, and the gaps in the screen will be in the form of similar narrow bands.

It is not necessary for the solar trap to be heliostatically mounted (i.e. to follow the sun) though this may be done. It is sufficient if the optic axes of the lenticular ribs and the cylindrical axes of the ribs are in the planes of the ecliptic, which in practice means that the plate faces south, with the ribs horizontal in an east-west direction, the plate being tilted to be normal to the sun's rays at noon. Then during the whole period of daylight, the images of the sun produced by the ribs fall on the gaps in the screen save for a small loss at the end of the plate. As the ribs may be produced in the glass by rolling, casting or drawing, it is possible to give them an accurate optical aplanatic shape resulting in very accurate focusing of the sun and the gaps in the screen may be correspondingly narrow.

The invention is illustrated, by way of example only, in the accompanying drawings in which:

Figs. 1 to 3 are cross-sections of a solar heater including a solar trap according to a first embodiment of the invention;

Fig. 4 is a cross-section of a solar heater including a solar trap according to a second embodiment of the invention;

Figs. 5 and 6 are front elevation and cross-section, respectively, of a wall comprising a window constituted by a solar trap according to a third embodiment of the invention.

The solar heater shown in Figs. 1 to 3 comprises a heat-insulated box 1, a receiver 2 and a cover plate 3a of glass.

The inner face of the glass plate is ribbed to form a series of contiguous parallel, substantially cylindrical lenses 4 which focus the sun's rays S onto a single plane ("focal plane") inside the box. A glass plate 8b is disposed in the box parallel to the plate 3a. The plate 8b is slidably inserted in grooves 23 which allow lateral displacement of this plate relative to the outer plate 3a. Handles or other appropriate means (not shown) may be provided for the adjustment of the position of the plate 8b from outside the box.

The rear or lower face of the plate 8b lies in the focal plane and is covered with a screen 5 having a number of slots 6 equal to the number of lenses 4 and substantially coextensive with the latter. When the screen is correctly adjusted relative to the plate 3a a solar image appears in every slot of the screen. The lower or inner surface of the screen is light-reflective. Preferably, the upper face of plate 8b is covered with a similar screen whose slots are, however, wider than those of the lower screen.

The side walls may be lined with mirrors 7, which will further increase the utilization of solar energy.

The solar trap thus improves the effective absorption coefficient of the receiver, for if some of the solar energy passing through the solar trap and striking the receiver is not absorbed but reflected back towards the solar trap, the mirror face of the latter reflects nearly all this solar energy back again onto the receiver. After a few passages to and fro across the gap between the receiver and the mirror face of the solar trap, substantially all the solar energy that has passed through the solar trap has been absorbed by the receiver. It follows that if the receiver has a certain natural absorptivity for solar energy, as is the case, for example, with copper, brass, Monel metal or the like, it may not be necessary to blacken it artificially in order to increase the absorption of solar energy since the solar trap has just such an absorption increasing effect. One advantage of not blackening the receiver is that the very low emissivity which is usual with metallic surfaces is not increased, as is generally the case when a blackening material is added to a surface. The low natural emissivity of the receiver means very low losses therefrom by radiation.

The solar heater may be mounted fixedly, with the solar trap facing south and being inclined normal to an average altitude of the sun corresponding to the latitude of the place, with the ribs running horizontally east-west. On the other hand it is, of course, also possible to mount it heliostatically, i.e. so that it can follow the sun both in height and direction.

The same device may also be used for producing electric current. In this case the receiver will be a photoelectric element as known per se and the reflective layer 5 will be adapted to reflect visible radiation, which may, interalia, be achieved by making it white.

The possibility of lateral adjustment of the screen relative to the lenses compensates for the changes of average altitude of the sun during the seasons in a non-heliostatic mounting of the solar heater. Fig. 1 shows the solar heater adjusted to an altitude of the sun of about 58°, being supposed to be the zenith at the equinoxes. Fig. 2 shows the adjustment for mid-winter, the pane 8b being slid upwards, and Fig. 3 shows the mid-summer adjustment with pane 8b being lowered as much as possible. The displacements of the pane 8b alter the positions of the foci relative to the lenses 4.

Fig. 4 shows an alternative construction to that illustrated in Figs. 1 to 3, which permits to alter the distance between the window and screen, when the distance of the focal plane from the window varies owing to the change of the angle of incidence of the radiation.

In this embodiment, screen 9 is hinged to parallel links 11 which are hinged at 13 to projections 14 of casing 1. This arrangement permits to keep the screen in the focal plane. Such an adjustment may be achieved automatically by means of a bi-metal as known per se.

The screen is constituted in this case by a metal plate, the rear face of which is reflective and which has slots 6. The receiver 2 is constituted as a photo-electric element, and the current produced therein flows off through leads 2'.

Solar traps as hereinbefore described can be used for the construction of roofs or side walls of green-houses or sun houses, which differ from the solar heaters mainly in that no receiver is provided so that the whole enclosed space is uniformly warmed.

Figs. 5 and 6 show a vertical solar trap in which screen 8b may be slid on slants 7 with the interposition of rollers 8. While the screen is moved from right to left or vice versa, as indicated by the double arrow in Fig. 5, the gaps 6 are vertically displaced.

I claim:

1. A window ("solar trap") for admitting solar radiation into an enclosed space, comprising at least one transparent plate having on the surface a plurality of lenses adapted to focus the solar radiation into said space where the foci of all the lenses are located substantially in one plane ("focal plane"), a laterally displaceable screen distinct from said transparent plate, disposed in said one plane and having narrow passages coordinated to the lenses and adjustable, by lateral displacement of the screen, into the position of the solar images formed by the lenses inside the space, and a reflecting surface on the screen on the space side of the screen adapted to reflect into the space any stray radiation otherwise apt to pass from the space outwards through the screen.

2. A solar trap as claimed in claim 1, wherein the lenses are substantially cylindrical ribs parallel to one another.

3. A solar trap as claimed in claim 1, wherein the lenses are arranged on the inner face of said transparent plate.

4. A solar trap as claimed in claim 1, wherein the screen is constituted by a transparent plate coated at least on one surface with a reflecting layer.

5. A solar trap as claimed in claim 1, wherein the screen is constituted by a reflective plate having openings for the passage of the sun rays focused thereon.

6. A solar trap as claimed in claim 1, wherein the screen is suspended from parallel links in such a manner that by lateral displacement of the screen its distance from the transparent plate can be varied in accordance with the angle of incidence of the light radiation and the corresponding displacement of the focal plane of the lenses.

References Cited in the file of this patent

UNITED STATES PATENTS

| | | |
|---|---|---|
| 201,439 | Moreau | Mar. 19, 1878 |
| 583,594 | Ewen | June 1, 1897 |
| 586,799 | Nerz | July 20, 1897 |
| 593,045 | Cummings | Nov. 2, 1897 |
| 965,391 | Little | July 26, 1910 |
| 980,505 | Emmet | Jan. 3, 1911 |
| 1,074,219 | Skiff | Sept. 30, 1913 |
| 1,130,871 | Willsie | Mar. 9, 1915 |
| 1,599,481 | Marcuse | Sept. 14, 1926 |
| 1,678,711 | Shipman | July 31, 1928 |
| 1,935,471 | Kanoit | Nov. 14, 1933 |
| 2,277,311 | Freeman | Mar. 24, 1942 |
| 2,338,654 | MacNeille | Jan. 4, 1944 |
| 2,552,237 | Trombe | May 8, 1951 |
| 2,595,905 | Telkes | May 6, 1952 |

FOREIGN PATENTS

| | | |
|---|---|---|
| 183,621 | Switzerland | Nov. 2, 1936 |